United States Patent
Kwak et al.

(10) Patent No.: US 8,404,615 B2
(45) Date of Patent: Mar. 26, 2013

(54) CATALYST FOR A CATHODE OF A MIXED REACTANT FUEL CELL, MEMBRANE-ELECTRODE ASSEMBLY FOR A MIXED REACTANT FUEL CELL INCLUDING THE SAME, AND MIXED REACTANT FUEL CELL SYSTEM INCLUDING THE SAME

(75) Inventors: Chan Kwak, Suwon-si (KR); Alexey Alexandrovichserov, Suwon-si (KR); Geun-Seok Chai, Suwon-si (KR); Soon-Ki Kang, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 947 days.

(21) Appl. No.: 12/076,544

(22) Filed: Mar. 19, 2008

(65) Prior Publication Data
US 2008/0318106 A1 Dec. 25, 2008

(30) Foreign Application Priority Data
Jun. 20, 2007 (KR) .................. 10-2007-0060450

(51) Int. Cl.
*B01J 27/057* (2006.01)
*B01J 27/045* (2006.01)
*B01J 31/00* (2006.01)
*H01M 8/10* (2006.01)

(52) U.S. Cl. ......... 502/215; 502/168; 502/223; 429/482

(58) Field of Classification Search .................. None
See application file for complete search history.

(56) References Cited

U.S. PATENT DOCUMENTS

| | | | |
|---|---|---|---|
| 6,245,707 B1* | 6/2001 | Chu et al. ............... | 502/167 |
| 2006/0116284 A1* | 6/2006 | Pak et al. ............... | 502/180 |
| 2007/0078052 A1* | 4/2007 | Grinberg et al. ........ | 502/150 |
| 2007/0122686 A1 | 5/2007 | Alexandrovichserov et al. | |

FOREIGN PATENT DOCUMENTS

| | | |
|---|---|---|
| JP | 59-101775 A | 6/1984 |
| KR | 2007-0037815 | 4/2007 |
| KR | 100706450 B1 | 4/2007 |
| KR | 100709198 B1 | 4/2007 |
| KR | 100766965 B1 | 10/2007 |
| KR | 10-2007-0037815 | 4/2009 |

OTHER PUBLICATIONS

Malakhov I.V. et al.: "In situ EXAFS studyof Ru-containing electrocatalysts of oxygen reduction." Nuclear Instruments and Methods in Physics Research A 448(2000) 323-326.
Alonso-Vante N. et al: "The structure analysis of the active centers of Ru-containing electrocatalysts for the oxygen reduction. An in situ EXAFS study." Electrochimica Acta 47(2002) 3807-3814.
European search report dated Sep. 5, 2008 in the corresponding European Patent Application No. 08156753.9.

* cited by examiner

*Primary Examiner* — Milton I Cano
*Assistant Examiner* — Sarah A Slifka
(74) *Attorney, Agent, or Firm* — Robert E. Bushnell, Esq.

(57) ABSTRACT

The cathode catalyst for a mixed reactant fuel cell includes a mixed catalyst that includes a first catalyst including a Ru—Ch1 compound where Ch1 is a chalcogens selected from the group consisting of S, Se, Te, and combinations thereof, and a second catalyst including a Pt—Ch2 compound where Ch2 is a chalcogens selected from the group consisting of S, Se, Te, and combinations thereof. The cathode catalyst can improve excellent power characteristics of a fuel cell due to excellent catalyst activity and selectivity.

19 Claims, 10 Drawing Sheets

CATALYST FOR A CATHODE OF A MIXED REACTANT FUEL CELL, MEMBRANE-ELECTRODE ASSEMBLY FOR A MIXED REACTANT FUEL CELL INCLUDING THE SAME, AND MIXED REACTANT FUEL CELL SYSTEM INCLUDING THE SAME

CROSS-REFERENCE TO RELATED APPLICATION AND CLAIM OF PRIORITY

This application claims priority to and the benefit of Korean Patent Application No. 10-2007-0060450 filed in the Korean Intellectual Property Office on Jun. 20, 2007, the entire content of which is incorporated herein by reference.

BACKGROUND OF THE INVENTION (a) Field of the Invention

The present invention relates to a cathode catalyst for a mixed reactant fuel cell, a membrane-electrode assembly for a mixed reactant fuel cell including the same, and a mixed reactant fuel cell system including the same.

(b) Description of the Related Art

A fuel cell is a power generation system for producing electrical energy through an electrochemical redox reaction of an oxidant and hydrogen in a hydrocarbon-based material.

Such a fuel cell is a clean energy source that can replace fossil fuels. It includes a stack composed of unit cells and produces various ranges of power output. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte membrane fuel cell has an advantage of high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the polymer electrolyte membrane fuel cell, but it has the advantages of easy handling of a fuel, being capable of operating at room temperature due to its low operation temperature, and no need for additional fuel reforming processors.

In the above fuel cell, the stack that generates electricity substantially includes several to scores of unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

A fuel is supplied to the anode and adsorbed on catalysts of the anode, and the fuel is oxidized to produce protons and electrons. The electrons are transferred into the cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

SUMMARY OF THE INVENTION

One embodiment of the present invention provides a cathode catalyst for a mixed reactant fuel cell that has excellent power characteristics.

Another embodiment of the present invention provides a membrane-electrode assembly for a mixed reactant fuel cell and a mixed reactant fuel cell system including the same.

According to one embodiment of the present invention, provided is a cathode catalyst for a mixed reactant fuel cell that includes a mixed catalyst that includes: a first catalyst including a Ru—Ch1 compound, where Ch1 is a chalcogens selected from the group consisting of S, Se, Te, and combinations thereof; and a second catalyst including a Pt—Ch2 compound where Ch2 is a chalcogens selected from the group consisting of S, Se, Te, and combinations thereof.

The cathode catalyst includes the first catalyst and the second catalyst in a weight ratio from 90:10 to 50:50.

The first catalyst includes Ru and Ch1 in a mole ratio from 80:20 to 95:5.

The first catalyst has an average particle diameter ranging from 2 to 8 nm.

The second catalyst includes Pt and Ch2 in a mole ratio from 70:30 to 99.5:0.5.

The second catalyst has an average particle diameter ranging from 2 to 8 nm.

The first catalyst or the second catalyst may be supported on a carrier selected from the group consisting of a carbon-based material, an inorganic material particulate, and mixtures thereof.

The carbon-based material may be selected from the group consisting of graphite, DENKA BLACK which is acetylene black, a type of carbon black obtained from thermal decomposition of acetylene, KETJEN BLACK which is a conductive carbon black, acetylene black, carbon nanotube, carbon nano fiber, carbon nano wire, carbon nano ball, activated carbon, and combinations thereof.

The inorganic material particulate may be an inorganic oxide including an element selected from the group consisting of Al, Si, Zr, Ti, W, and combinations thereof.

The first catalyst or the second catalyst may be supported on a carrier in an amount of 50 to 90 wt % based on the total weight of the catalyst.

According to another embodiment of the present invention, provided is a membrane-electrode assembly for a mixed reactant fuel cell that includes a polymer electrolyte membrane, and an anode catalyst layer and a cathode catalyst layer respectively disposed at each side of the polymer electrolyte membrane. The cathode catalyst layer includes the above cathode catalyst.

The anode catalyst layer includes a platinum-ruthenium alloy catalyst.

The polymer electrolyte membrane may include a polymer resin having a cation exchange group selected from the group consisting of a sulfonic acid group, a carboxylic acid group, a phosphoric acid group, a phosphonic acid group, and derivatives thereof, at its side chain.

According to yet another embodiment of the present invention, a mixed reactant fuel cell system is provided that includes: an electricity generating element, including the above membrane-electrode assembly and a plurality of conductive plates positioned at each side of the membrane-electrode assembly; a fuel supplier that supplies the electricity generating element with a fuel; and an oxidant supplier that supplies the electricity generating element with an oxidant.

In one embodiment, the conductive plate is selected from the group consisting of carbon paper, carbon cloth, carbon felt, a metal cloth, and combinations thereof, but the conductive plate is not limited thereto.

The electricity generating element may further include a microporous layer between the cathode or anode catalyst layer of the membrane-electrode assembly, and the conductive plate.

The fuel may be a lower alcohol having a carbon number of 1 to 4.

The mixed reactant fuel cell system may further include a reactant mixing part.

The fuel cell system may be a direct oxidation fuel cell system, in particular a direct methanol fuel cell system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE INVENTION

Figure 1:
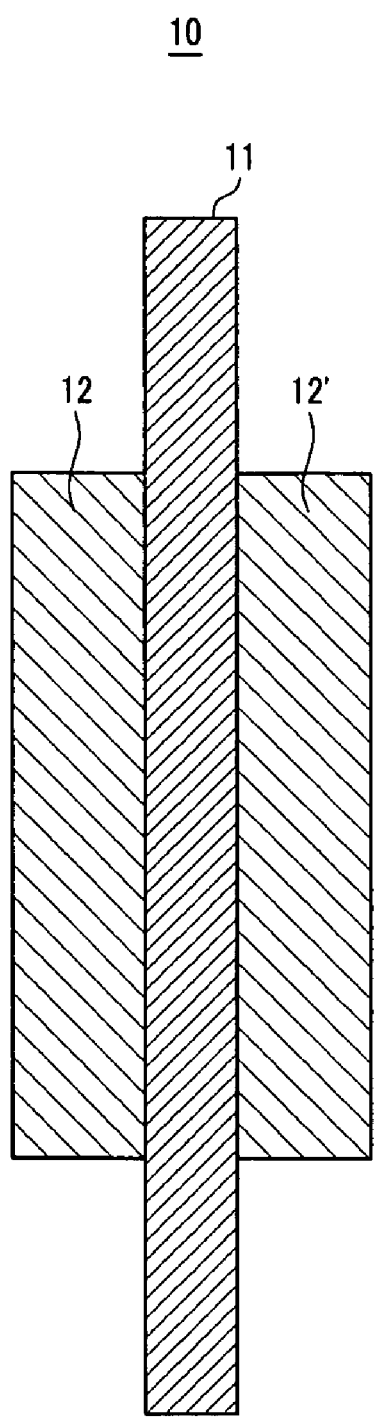
FIG. 1 is a schematic cross-sectional view showing a membrane-electrode assembly for a mixed reactant fuel cell according to an embodiment of the present invention.

A fuel cell is a power generation system producing electrical energy from an oxidation reaction of a hydrocarbon fuel such as methanol, ethanol, or natural gases, and a reduction reaction of an oxidant. It generally includes a fuel supplier, an electricity generating element, and an oxidant supplier.

The electricity generating element is a part that generates electrical energy using a fuel and an oxidant from a fuel supplier and an oxidant supplier, respectively. It is generally composed of several membrane-electrode assemblies with a separator disposed between them. The membrane-electrode assembly includes an anode catalyst layer and a cathode catalyst layer, and further includes a polymer electrolyte membrane that transfers protons that are generated on the anode catalyst layer to the cathode catalyst layer.

The bipolar plate plays roles of supplying the fuel and the oxidant to the anode and the cathode for the reaction in the fuel cell and of physically separating the membrane-electrode assemblies. In the general fuel cell system, the fuel and the oxidant are injected into the anode catalyst layer and the cathode catalyst layer, respectively. Since the performance of fuel cells is deteriorated in the case that the fuel or oxidant is supplied to the opposite electrode, the bipolar plate is required to prevent inflowing between the two electrodes.

However, a mixed reactant fuel cell includes one catalyst that selectively activates the oxidation reaction of the fuel in the anode catalyst layer and another catalyst that selectively activates the reduction reaction of the oxidant in the cathode catalyst layer. Therefore, a mixture of the fuel and the oxidant is injected into the electricity generating element. Even though the mixture of the fuel and the oxidant is supplied, only an oxidation reaction of the fuel is carried out in the anode and only a reduction reaction of the oxidant is carried out in the cathode. The mixed reactant fuel cell of the present invention does not require bipolar plates that are needed to separate membrane-electrode assemblies from each other in conventional fuel cells, and cross-over of the fuel is also not a consideration. Therefore, the mixed reactant fuel cell of the present invention can remarkably reduce production costs for a fuel cell and also down-size a fuel cell.

The mixed reactant fuel cell can operate well when a catalyst included in a membrane-electrode assembly has selectivity. In other words, a catalyst used as a cathode catalyst should only reduce an oxidant but should not react with a fuel. Accordingly, a direct oxidation fuel cell in general does not include a platinum catalyst but rather a non-platinum catalyst with selectivity. However, the non-platinum catalyst has a disadvantage of low activity for reduction of an oxidant, unlike a platinum catalyst.

Therefore, an embodiment of the present invention uses a mixed catalyst including a chalcogenide catalyst of platinum group and a non-platinum group catalyst as a cathode catalyst for a mixed reactant fuel cell, and thereby, can increase selectivity and catalyst activity in a cathode catalyst layer, accomplishing excellent power characteristics.

The cathode catalyst for a mixed reactant fuel cell according to one embodiment of the present invention includes a mixed catalyst that includes: a first catalyst including a Ru—Ch1 compound, where Ch1 is a chalcogens selected from the group consisting of S, Se, Te, and combinations thereof; and a second catalyst including a Pt—Ch2 compound where Ch2 is a chalcogens selected from the group consisting of S, Se, Te, and combinations thereof.

In the first catalyst, ruthenium (Ru) has an active site, which has high surface energy, where an oxidant is reduced. The Ru does not belong to a platinum group but has high catalyst activity for reduction of an oxidant and also good electrical conductivity, and thereby excellent selectivity and stability for reduction of an oxidant. However, the Ru has a problem of easily absorbing oxygen in the air. The absorbed air can block the active center of the Ru, where an oxidant is reduced, and thereby make the reduction of an oxidant difficult.

The Ch1 is a chalcogens selected from the group consisting of S, Se, Te, and combinations thereof. It can prevent oxygen in the air from being combined with Ru, and thereby promote catalyst activity of the Ru for reduction of an oxidant.

In addition, the chalcogens indicates elements belonging to the same group as oxygen in the periodic table, and thereby has similar properties to oxygen. In other words, it has excellent selectivity for reduction of oxygen. In other words, when a catalyst including the chalcogens is used for a reduction electrode, the chalcogens can promote reduction of oxygen while suppressing oxidation of a fuel, resultantly improving cell performance. In particular, since Se and Te among the chalcogens have a large atomic weight, they can prevent an over-crossed fuel, such as methanol and the like, from penetrating into a catalyst so that the catalyst poisoning can be prevented when it is used for a direct oxidation fuel cell.

Accordingly, the first catalyst has relatively high activity and excellent selectivity but does not become inactivated by a fuel.

The first catalyst may include Ru and Ch1 in a mole ratio from 80:20 to 95:5. According to another embodiment of the present invention, it may include them in a mole ratio from 85:15 to 90:10. When Ch1 is included in an amount of less than the above range, that is, Ch1 is included in an amount extremely less than Ru, it cannot prevent methanol from approaching Ru and therefore cannot prevent catalyst poisoning, resulting in deteriorating catalyst activity. On the other hand, when Ch1 is included in a large amount in proportion to Ru, it may hinder a reaction material such as oxygen or a product such as water, as well as methanol, from being smoothly released, thereby deteriorating catalyst activity. In addition, the Ch1 may deteriorate electrical conductivity, and thereby deteriorate cell performance, due to high resistance.

The first catalyst has an average particle diameter ranging from 2 to 8 nm. In one embodiment, the first catalyst has an average particle diameter ranging from 3 to 6 nm. When it has an average particle diameter of less than 2 nm, it may not only be hard to fabricate but also may become aggregated together. On the other hand, when it has an average particle diameter of more than 8 nm, it may deteriorate catalyst activity due to decreasing a specific surface area.

The second catalyst includes Pt having high activity for reduction of an oxidant, particularly, oxygen, and thereby can be widely used as a catalyst of a reduction electrode. However, since the Pt also has excellent catalyst activity for reduction of a fuel, it is preferably used not as a mere metal but as a chalcogenide, which is formed through reaction with a chalcogens.

The Ch2, which reacts with Pt and thereby forms a chalcogenide, is a chalcogens selected from the group consisting of S, Se, Te, and combinations thereof, like the aforementioned Ch1.

In the second catalyst, Pt is an important component playing a critical role for catalyst activity. Accordingly, the amount of Pt should be strictly controlled. When more Pt is included, the more the catalyst activity can be improved. On the contrary, when less Pt is included, the tolerance against methanol can be increased. Accordingly, the second catalyst may include Pt and a chalcogens in a mole ratio from 70:30 to 99.5:0.5. According to another embodiment of the present invention, it may include them in a mole ratio from 80:20 to 95:5. When they are included within the above range, the chalcogens can sufficiently surround the surface of the platinum, and thereby increase tolerance against methanol. However, when the chalcogens is included less than the above range, i.e., extremely less than Pt, it cannot block methanol from approaching the Pt. On the contrary, when the chalcogens is included more than the above range, i.e., extremely more than Pt, the chalcogens may be too accumulated on the surface of the platinum, thereby blocking a reaction site thereon.

The second catalyst may have an average particle diameter of 2 to 8 nm. However, according to another embodiment, it may have an average particle diameter of 3 to 6 nm. When it has an average particle diameter of less than 2 nm, it is hard to fabricate, while when it has an average particle diameter of more than 8 nm, it may deteriorate catalyst activity.

The first catalyst and the second catalyst may be used in a form of a metal itself (black catalyst), or one supported on a carrier. The carrier may include a carbon-based material such as graphite, DENKA BLACK, KETJEN BLACK, acetylene black, carbon nanotube, carbon nanofiber, carbon nanowire, carbon nano balls, or activated carbon, or an inorganic oxide material particulate including an element selected from the group consisting of Al, Si, Zr, Ti, W, and combinations thereof such as alumina, silica, zirconia, titania, and so on.

The carbon-based material can have an effect not only on increasing a reaction area but also can prevent deterioration of conductivity due to combination of Ru or Pt with a chalcogens in the first and second catalysts.

The first catalyst or the second catalyst may be supported on a carrier in an amount of 50 to 90 wt % based on the total weight of the catalyst. In one embodiment, the first catalyst or the second catalyst may be supported on a carrier in an amount of 60 to 80 wt % based on the total weight of the catalyst. When it is supported in an amount of less than 50 wt %, a catalyst may lack activity. However, when it is supported in an amount of more than 90 wt %, a catalyst may have increased particle size and decreased electrical conductivity due to a chalcogens, resultantly deteriorating catalyst performance.

The first and second catalysts may be included in a weight ratio from 90:10 to 50:50. According to one embodiment of the present invention, the first and second catalysts may be included in a weight ratio such as 90:10 to 80:20, 80:20 to 70:30, 70:30 to 60:40, and 60:40 to 50:50. However, it may be included in a weight ratio from 70:30 to 60:40 according to still another embodiment. When the first and second catalysts are mixed within the above optimal range, they can accomplish excellent catalyst activity and selectivity. However, when the second catalyst is included more than the above mixing ratio range, i.e., extremely more than the first catalyst, the catalyst may have deteriorated activity. On the other hand, when the second catalyst is included less than the above mixing ratio range, i.e., extremely less than the first catalyst, the catalyst may have deteriorated selectivity and also increased material cost.

According to another embodiment, a membrane-electrode assembly for a mixed reactant fuel cell including the above cathode catalyst is provided.

FIG. 1 is a schematic cross-sectional view showing a membrane-electrode assembly for a mixed reactant fuel cell according to an embodiment of the present invention.

Referring to FIG. 1, a membrane-electrode assembly 10 generates electrical energy from an oxidation reaction of a fuel and a reduction reaction of an oxidant, and includes a polymer electrolyte membrane 11, and a cathode catalyst layer 12 and an anode catalyst layer 12' respectively disposed at each side of the polymer electrolyte membrane 11.

The cathode catalyst layer 12 and anode catalyst layer 12' respectively include a catalyst that acts to catalyze the related reactions (oxidation of an oxidant and reduction of a fuel).

The cathode catalyst layer 12 includes a mixed catalyst that includes: a first catalyst including a Ru—Ch1 compound where Ch1 is a chalcogens selected from the group consisting of S, Se, Te, and combinations thereof; and a second catalyst including a Pt—Ch2 compound where Ch2 is a chalcogens selected from the group consisting of S, Se, Te, and combinations thereof. The mixed catalyst is the same as above described.

The cathode catalyst layer 12 may further include a catalyst having selectivity for reduction reaction of an oxidant, as well as the above first and second catalysts. For example, the cathode catalyst may further include at least one selected from the group consisting of Fe-tetraphenylporphyrin (Fe-TPP), Co-tetraphenylporphyrin, (Co-TPP), Fe-tetramethoxyphenylporphyrin, (Fe-TMPP), Co-tetramethoxyphenylporphyrin (Co-TMPP), Fe-phthalocyanine (Fe—PC), Co-phthalocyanine (Co—PC), Ru—Mo—S, Ru—Mo—Se, Ru—W—S, and Ru—W—Se. These catalysts have high activity and selectivity for oxidant reduction.

In particular, the Fe-tetraphenylporphyrin (Fe-TPP), Co-tetraphenylporphyrin (Co-TPP), Fe-tetramethoxyphenylporphyrin (Fe-TMPP), Co-tetramethoxyphenylporphyrin (Co-TMPP), Fe-phthalocyanine (Fe—PC), and Co-phthalocyanine (Co—PC) may be subjected to heat treatment in order to obtain an excellent catalyst effect.

In one embodiment, the anode catalyst layer 12' may include a catalyst being capable of selectively performing a fuel oxidation reaction. In particular, a platinum-ruthenium alloy catalyst can be used for the anode catalyst layer, but is not limited thereto.

The catalyst in the anode catalyst layer 12' can be used in a form of a metal itself (black catalyst), or one supported on a carrier, as the cathode catalyst. For the carrier, carbon can be generally used.

The cathode catalyst layer 12 and the anode catalyst layer 12' may further include a binder resin to improve adherence to the polymer electrolyte membrane 11 and proton transfer properties.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain.

Non-limiting examples of the proton conductive polymer resin include at least one selected from the group consisting of perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The binder resins may be used singularly or in combination. They may be used along with non-conductive polymers to improve adherence with the polymer electrolyte membrane. The binder resins may be used in a controlled amount according to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The cathode catalyst layer 12 and anode catalyst layer 12' having the above structure may be porous for making material transfer easy.

The polymer electrolyte membrane 11 is disposed between the cathode catalyst layer 12 and the anode catalyst layer 12'.

The polymer electrolyte membrane 11 functions as an ion exchanger by delivering protons produced at the anode catalyst layer 12' to the cathode catalyst layer 12. In one embodiment, the polymer electrolyte membrane 11 may be porous for ion exchange performance.

The polymer electrolyte membrane 11 for the polymer electrolyte membrane 10 of the present invention may be any polymer resin having proton conductivity. Examples of the proton conductive polymer are a polymer resin having a cation exchange group selected from the group consisting of a sulfonic acid group, a carboxylic acid group, a phosphoric acid group, a phosphonic acid group, and derivatives thereof, at its side chain.

Non-limiting examples of the proton conductive polymer include at least one selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H can be replaced with Na, K, Li, Cs, or tetrabutylammonium in a cation exchange group of the proton conductive polymer. When the H is substituted by Na in an ion exchange group at the terminal end of the cation exchange group, NaOH is used. When the H is replaced with tetrabutylammonium, tributylammonium hydroxide is used. K, Li, or Cs can also be replaced by using appropriate compounds. A method of substituting H is known in this related art, and therefore is not further described in detail.

The thickness of the polymer electrolyte membrane 11 has no particular limit, but may have a thickness of 10 to 200 μm. Since a mixed reactant fuel cell has no problem of fuel crossover, it may include a polymer electrolyte membrane 11 with a thickness of 10 to 100 μm.

The membrane-electrode assembly 10 includes a mixed catalyst of the first catalyst including Ru—Ch1 in a cathode catalyst layer and the second catalyst including Pt—Ch2, and thereby can have excellent catalyst activity and selectivity for reduction of an oxidant. Accordingly, when it is applied to a cell system, it can improve cell characteristics.

According to another embodiment of the present invention, a mixed reactant fuel cell system including the above membrane-electrode assembly 10 is provided.

The mixed reactant fuel cell system includes an electricity generating element, which includes at least one membrane-electrode assembly and a plurality of conductive plates positioned at each side of the membrane-electrode assembly, a fuel supplier that supplies the electricity generating element with a fuel, and an oxidant supplier that supplies the electricity generating element with an oxidant. The membrane-electrode assembly is the same as above described.

Figure 2:
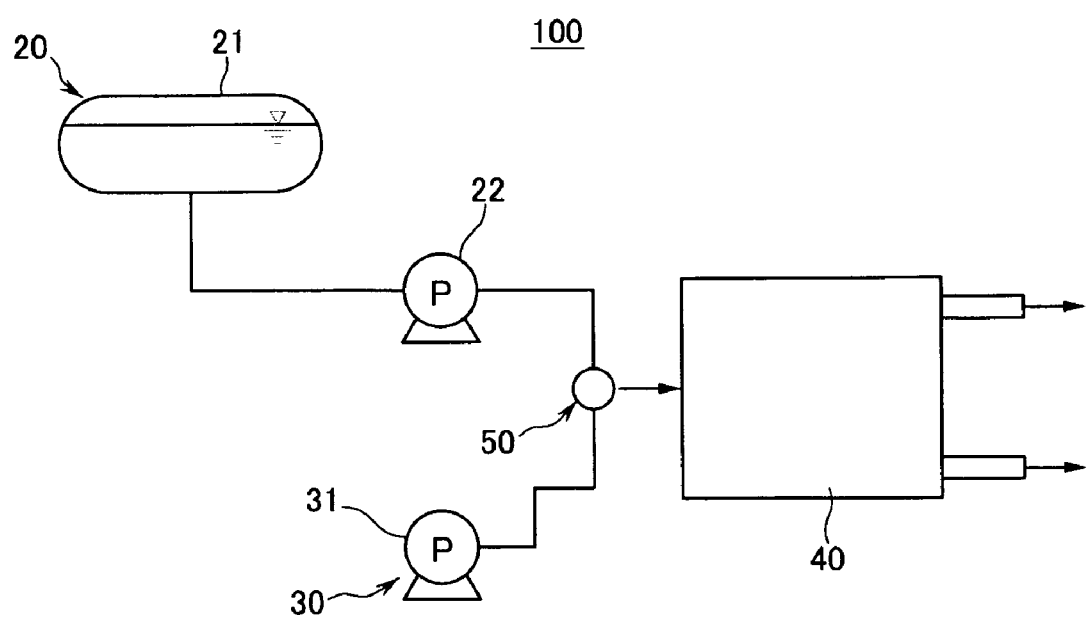
FIG. 2 is a schematic diagram showing the structure of a mixed reactant fuel cell system according to one embodiment of the present invention.
Figure 3A:
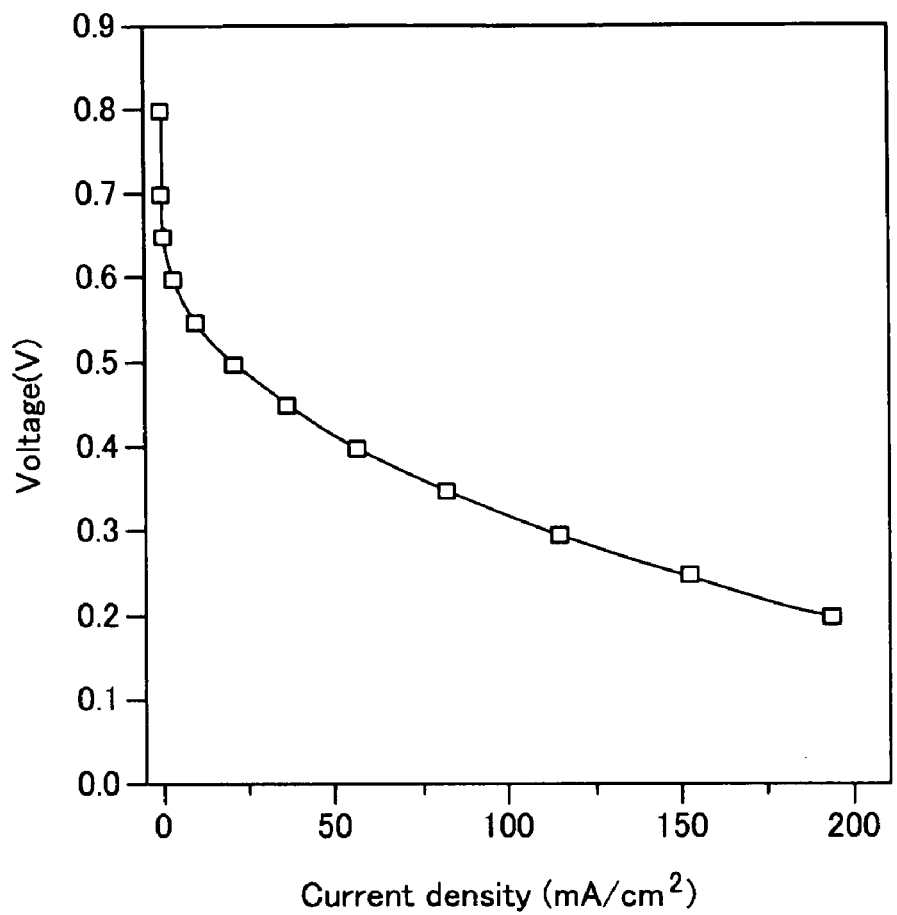
FIG. 3A is a graph showing voltage of the single cell according to Example 1 of the present invention.
Figure 3B:
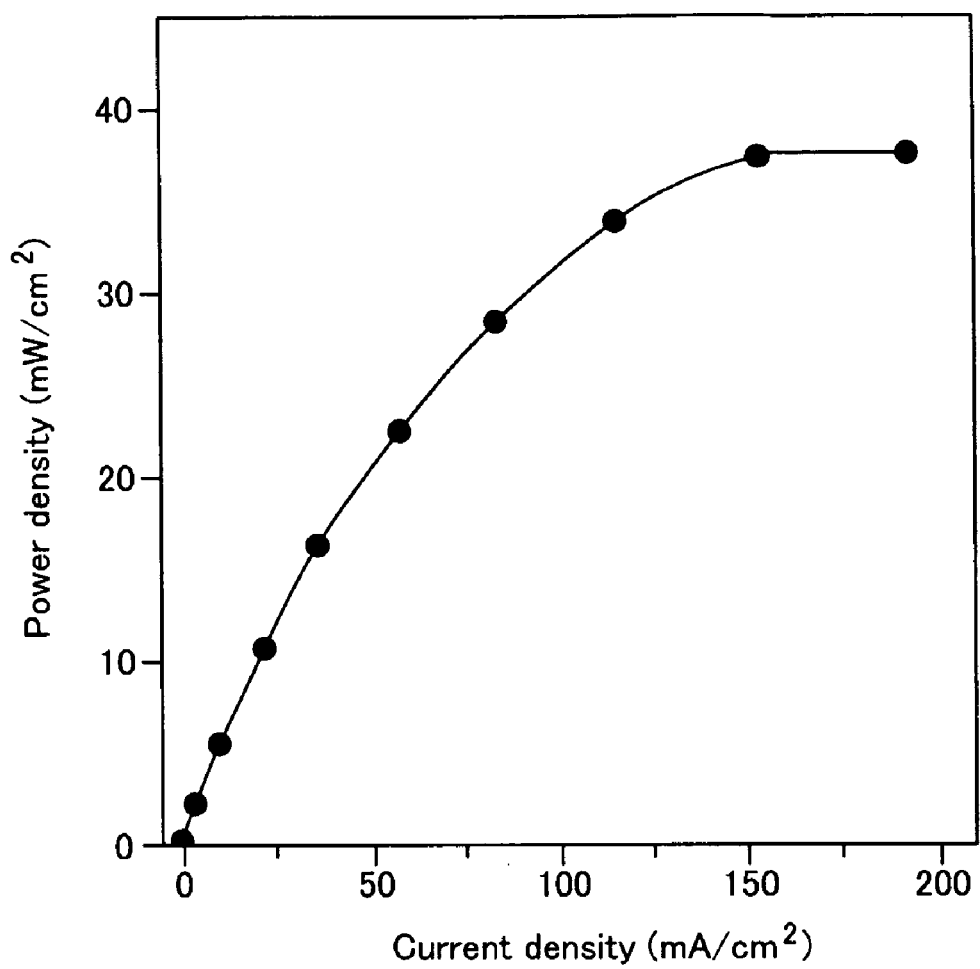
FIG. 3B is a graph showing power of the single cell according to Example 1 of the present invention.
Figure 4A:
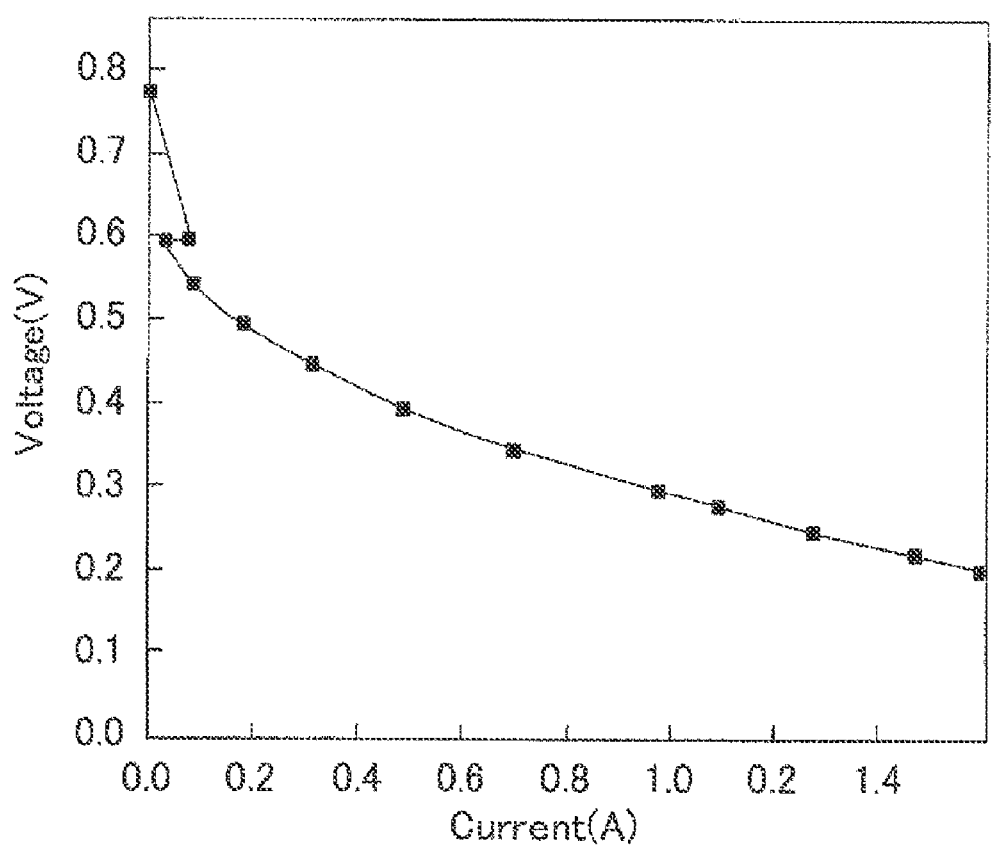
FIG. 4A is a graph showing voltage of the single cell according to Example 2 of the present invention.
Figure 4B:
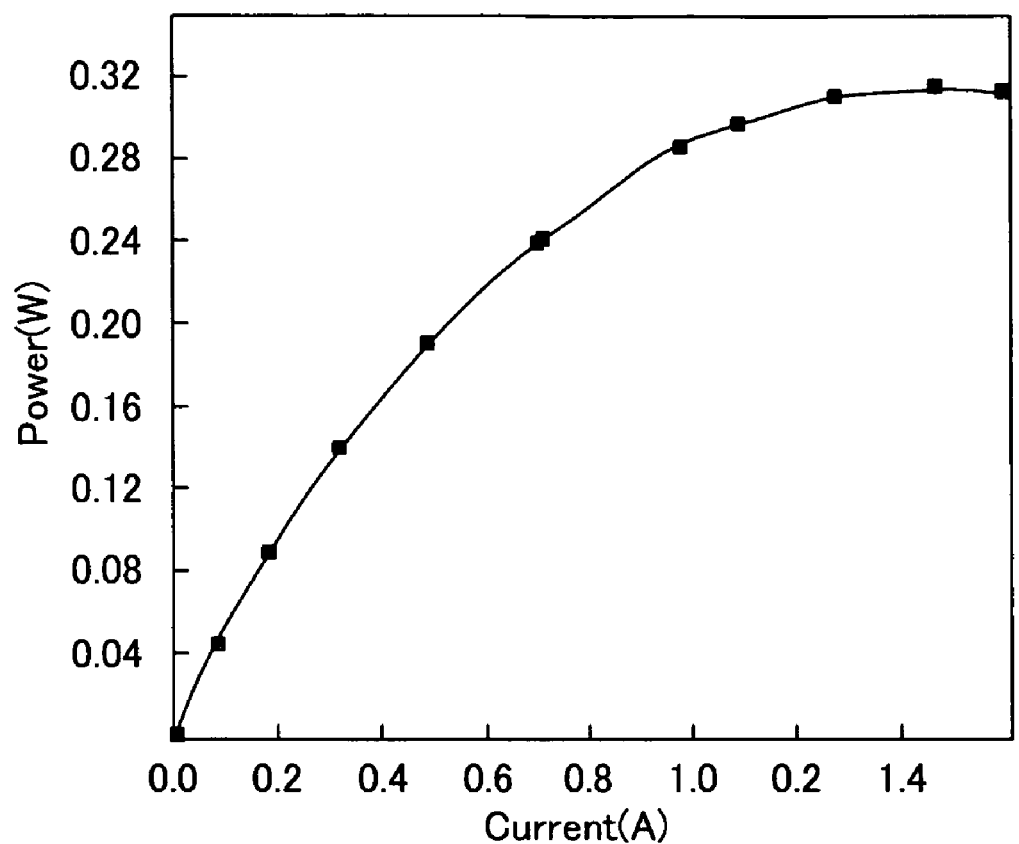
FIG. 4B is a graph showing power of the single cell according to Example 2 of the present invention.
Figure 5A:
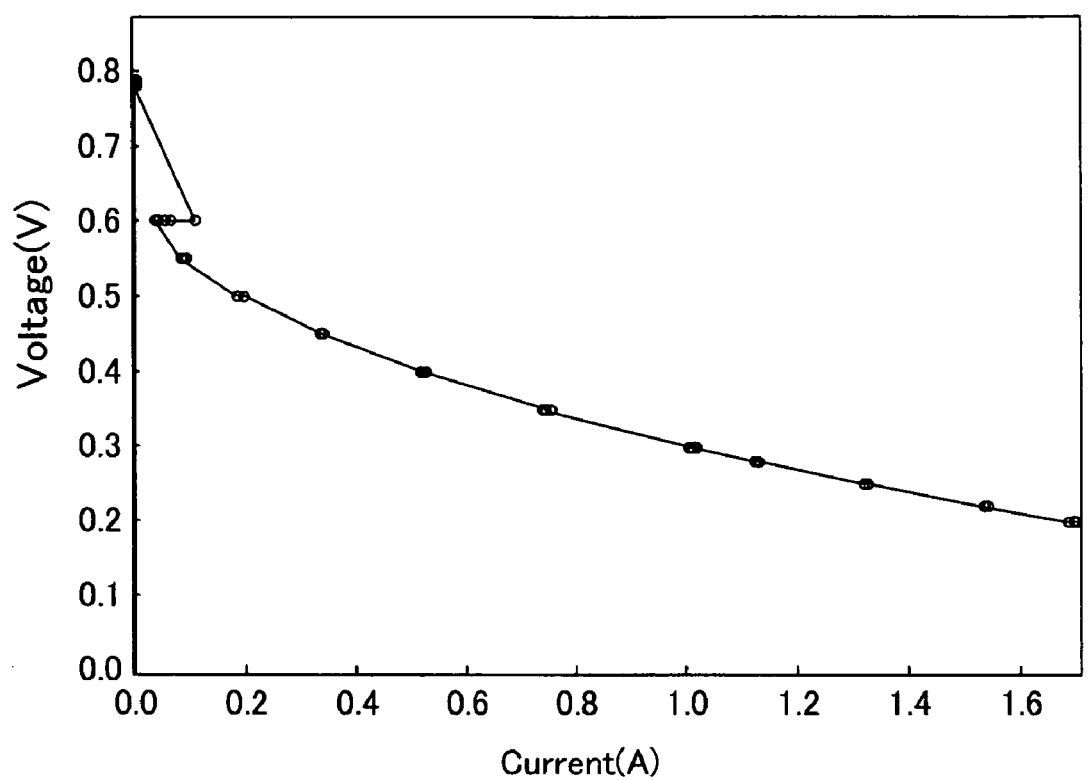
FIG. 5A is a graph showing voltage of the single cell according to Example 3 of the present invention.
Figure 5B:
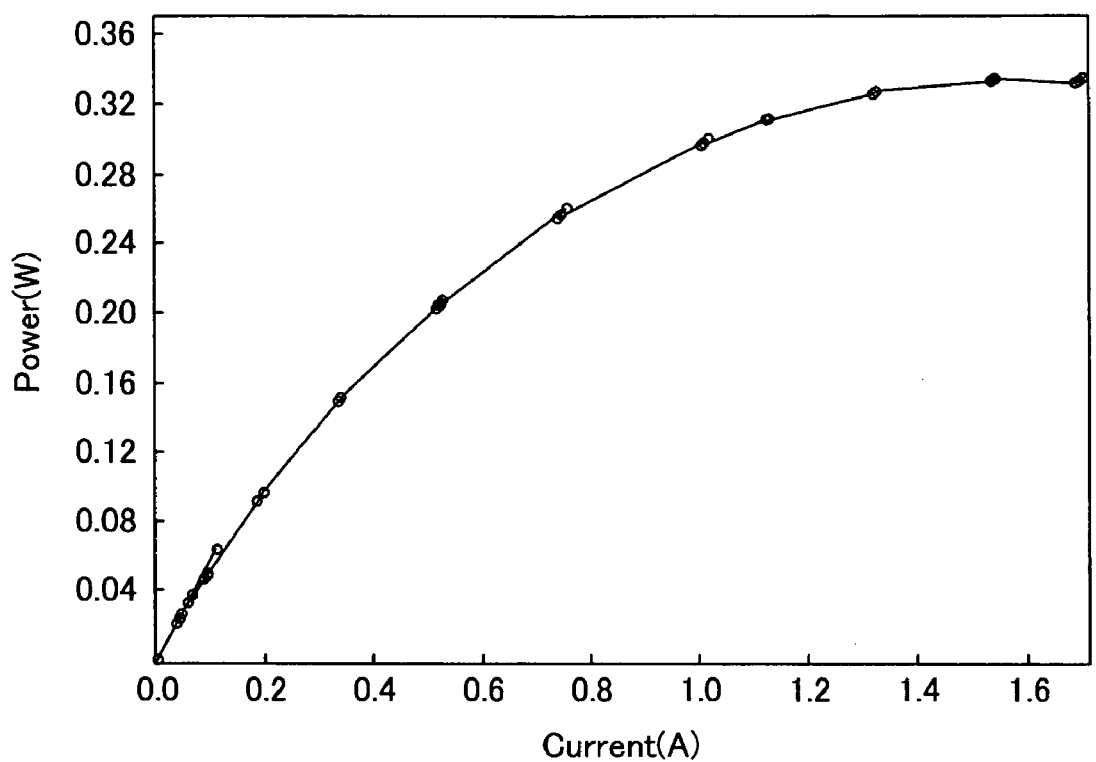
FIG. 5B is a graph showing power of the single cell according to Example 3 of the present invention.
Figure 6A:
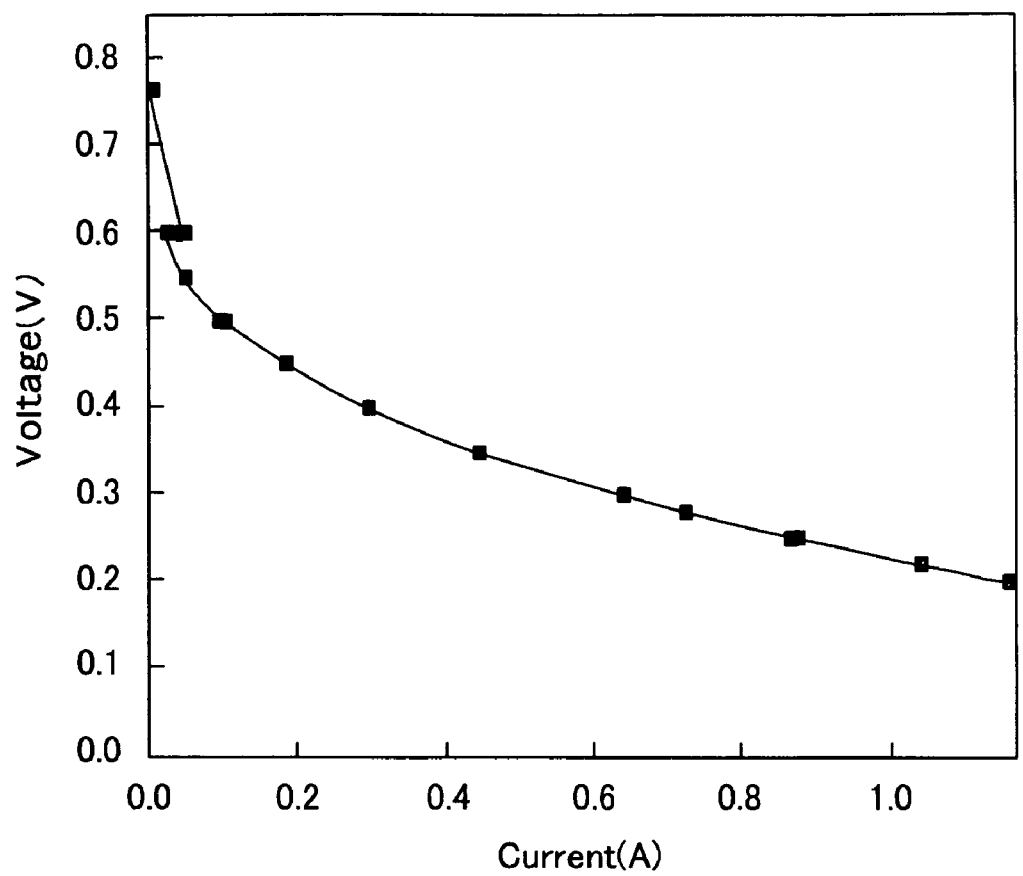
FIG. 6A is a graph showing voltage of the single cell according to Comparative Example 1.
Figure 6B:
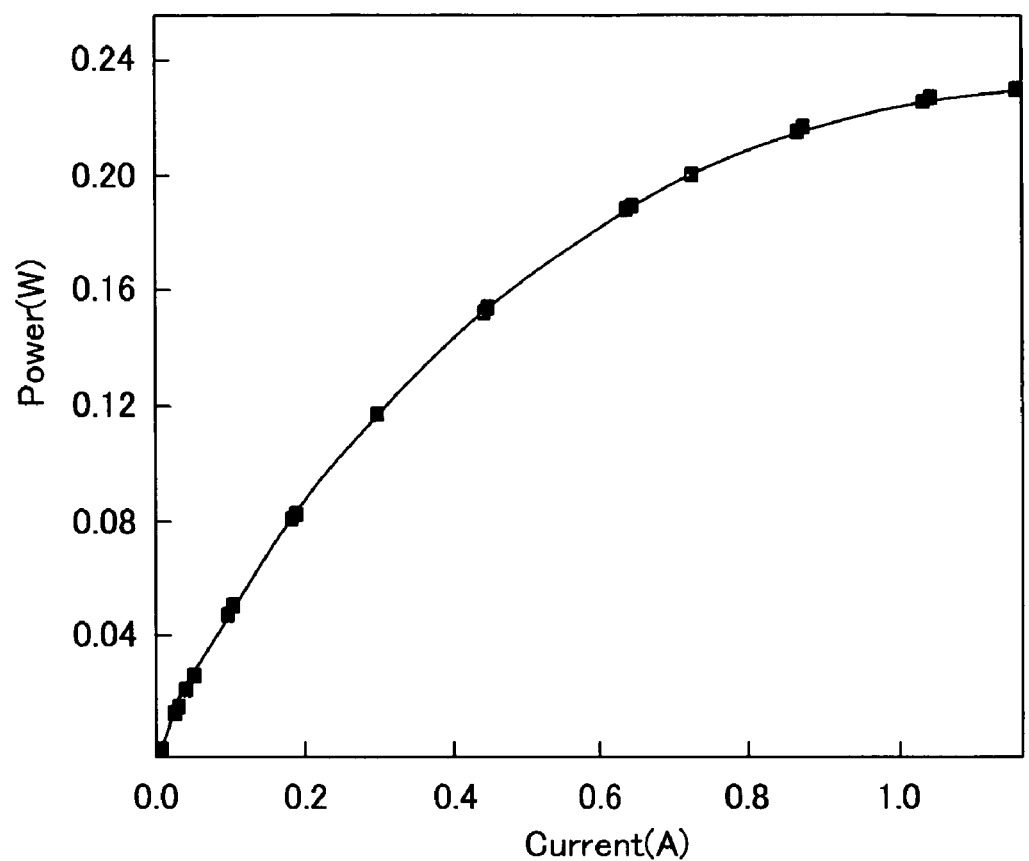
FIG. 6B is a graph showing power of the single cell according to Comparative Example 1.

FIG. 2 is a schematic diagram showing the structure of a mixed reactant fuel cell system 100 according to one embodiment of the present invention. FIG. 2 illustrates a fuel cell system wherein a fuel and an oxidant are provided to an electricity generating element 40 through pumps 22 and 31, but the present invention is not limited to such a structure. The fuel cell system of the present invention may alternatively include a structure wherein a fuel and an oxidant are provided in a diffusion manner.

The fuel cell system 100 includes at least one electricity generating element 40 that generates electrical energy through an electrochemical reaction of a fuel and an oxidant, a fuel supplier 20 for supplying the fuel to the electricity generating element 40, and an oxidant supplier 30 for supplying the oxidant to the electricity generating element 40.

The electricity generating element 40 includes at least one membrane-electrode assembly and a plurality of conductive plates disposed on both sides of the membrane-electrode assembly. The membrane-electrode assembly is the same as above described.

The conductive plate (not shown) supports catalyst layers of the membrane-electrode assembly and provides a path for transferring the fuel and the oxidant to catalyst layers in a diffusion manner. In one embodiment, the conductive plate may be porous for making material transfer easy.

The conductive plate is formed from a material such as carbon paper, carbon cloth, carbon felt, or a metal cloth (a porous film composed of a metal fiber or a metal film disposed on a surface of a cloth composed of polymer fibers). The conductive plate is not limited thereto.

In one embodiment, a metal cloth having high heat conductivity may be appropriate for the conductive plate.

The electricity generating element 40 may further include a microporous layer (not shown) between the cathode or anode catalyst layer of the membrane-electrode assembly and the conductive plate in order to increase reactant diffusion.

The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohoms, carbon nanorings, or combinations thereof.

The microporous layer is formed by coating a composition including a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

The electricity generating element 40 is connected with the fuel supplier 20 and the oxidant supplier 30.

The fuel supplier 20 is equipped with a tank 21 that stores the fuel, and a pump 22 that is connected therewith. The fuel pump 22 supplies a fuel stored in the tank 21 with a predetermined pumping power.

The fuel may include a lower alcohol having C1 to C4 such as methanol, ethanol, propanol, butanol, and so on. For the oxidant, oxygen is representative but pure oxygen or air may be used, and it is not limited thereto.

The oxidant supplier 30, which supplies the electricity generating element 40 with the oxidant, is equipped with at least one pump 31 for supplying the oxidant with a predetermined pumping power.

In a mixed reactant fuel cell system of the present invention, a fuel and an oxidant can be supplied as a mixture to an electricity generating element 40 or respectively supplied to each different part of an electricity generating element 40. Since the electricity generating element 40 is porous, a fuel and an oxidant can be diffused all over the electricity generating element 40 in either of the above methods. When a fuel and an oxidant are supplied as a mixture, a mixed reactant fuel cell system 100 can further include a reactant mixing part 50 for mixing a fuel supplied from a fuel supplier 20 and an oxidant supplied from an oxidant supplier 30 and supplying them to an electricity generating element 40.

The mixed reactant fuel cell system may be applied to a polymer electrolyte membrane fuel cell (PEMFC), or a direct oxidation fuel cell (DOFC). In one embodiment, it is most appropriate for a DOFC, particularly for a direct methanol fuel cell.

The following examples illustrate the present invention in more detail. However, it is understood that the present invention is not limited by these examples.

Preparation Example 1

Preparation of a RuSe/C Catalyst 1 g of $RuCl_3$ hydrate was dissolved in 2 ml of acetone. The prepared solution was supported on 1 g of a carbon carrier. The resulting product was dried at 70° C. with atmospheric pressure for 24 hours, and dried again at 140° C. under a vacuum condition for 4 hours. The dried specimen was heat-treated under a mixed gas atmosphere including $H_2$ and $N_2$ in a volume ratio of 1:1 at 300° C. for 4 hours, preparing a Ru/C catalyst supported on a carbon carrier. Then, 0.075 g of $H_2SeO_3$ was dissolved in 3 ml of acetone. The prepared solution was supported on the prepared Ru/C catalyst. The resulting product was dried at 70° C. with atmospheric pressure for 24 hours, and also at 140° C. under a vacuum condition for 4 hours.

The dried specimen was heat-treated under a mixed gas atmosphere including $H_2$ and $N_2$ in a volume ratio of 1:1 at 300° C. for 4 hours, preparing a RuSe/C catalyst.

The RuSe/C catalyst included Ru and Se in a mole ratio of 90:10 and was supported on a carbon carrier in an amount of 80 wt %. It had a catalyst particle size of 4 nm.

Preparation Example 2

Preparation of a PtS/C Catalyst 0.06 g of sulfur was added to 150 mlg of benzene to prepare a sulfuric benzene solution. Then, 1 g of $Pt_3(CO)_{12}$ was added to the sulfuric benzene solution, preparing a mixture. The mixture was allowed to stand for one hour, and 1 g of a KETJEN BLACK carrier was added thereto. The resulting product was refluxed at 100° C. for 48 hours. The refluxed product was filtrated and the obtained product was dried at 80° C. for 24 hours. The dried product was fired at 250° C. under a nitrogen atmosphere, preparing a PtS/C cathode catalyst.

The PtS/C catalyst included Pt and S in a mole ratio of 90:10 and was supported on a carbon carrier in an amount of 66 wt %. The catalyst had a particle size of 4 nm.

Example 1

Fabrication of a Mixed Reactant Fuel Cell

The RuSe/C catalyst and the PtS/C catalyst prepared according to Preparation Examples 1 and 2 were mixed in a weight ratio of 70:30 to prepare a mixed catalyst. 0.34 g of the mixed catalyst was mixed with 2.1 g of a 5 wt % polyperfluorosulfonate binder in 7.4 ml of a mixed solvent including isopropyl alcohol and water, preparing a catalyst slurry for a cathode. The catalyst slurry for a cathode was coated on a carbon paper conductive plate, and then dried to form a cathode catalyst layer thereon.

Additionally, 0.34 g of platinum-ruthenium black and 2.08 g of a polyperfluorosulfonate binder were mixed in 7.4 ml of a mixed solvent including isopropyl alcohol and water (mixing ratio=9:1) to prepare a catalyst slurry for an anode. The catalyst slurry for an anode was coated on a carbon paper conductive plate, and then dried to form an anode catalyst layer thereon.

The conductive plates respectively having the cathode and anode catalyst layers were positioned at each side of a polymer electrolyte membrane formed of a polymer perfluorosulfonic acid. Then, they were hot-pressed at 125° C. with a pressure of 200 kgf/cm² for 3 minutes, preparing a membrane-electrode assembly for a mixed reactant fuel cell.

The membrane-electrode assembly was inserted between glass fiber gaskets coated with polytetrafluoroethylene, and then pressed between copper end plates, fabricating a unit cell. The unit cell was connected with a fuel supplier and an oxidant supplier, fabricating a mixed reactant fuel cell system.

Example 2

Fabrication of a Mixed Reactant Fuel Cell

A mixed reactant fuel cell system was fabricated according to the same method as in Example 1 except for using a mixed catalyst for a cathode prepared by mixing the RuSe/C and PtS/C catalysts of Preparation Examples 1 and 2 in a weight ratio of 90:10.

Example 3

Fabrication of a Mixed Reactant Fuel Cell

A mixed reactant fuel cell system was fabricated according to the same method as in Example 1 except for using a mixed catalyst for a cathode prepared by mixing the RuSe/C catalyst and the PtS/C catalyst of Preparation Examples 1 and 2 in a weight ratio of 50:50.

Example 4

Fabrication of a Mixed Reactant Fuel Cell

A mixed reactant fuel cell system was fabricated according to the same method as in Example 1 except for using a mixed catalyst for a cathode prepared by mixing a RuTe catalyst and a PtSe catalyst in a weight ratio of 70:30 instead of mixing the RuSe/C catalyst and the PtS/C catalyst in a weight ratio of 70:30.

Herein, the RuTe catalyst included Ru and Te in a mole ratio of 80:20 and had a catalyst particle size of 2 nm, while the PtSe catalyst included Pt and Se in a mole ratio of 70:30 and had a catalyst particle size of 3 nm.

Example 5

Fabrication of a Mixed Reactant Fuel Cell

A mixed reactant fuel cell system was fabricated according to the same method as in Example 1 except for using a mixed catalyst for a cathode prepared by mixing a RuS/C+SiO₂ catalyst and a PtTe/C+TiO₂ catalyst in a weight ratio of 70:30 instead of mixing the RuSe/C catalyst and the PtS/C catalyst in a weight ratio of 70:30.

Herein, the RuS/C+SiO₂ catalyst included Ru and S in a mole ratio of 95:5, had a catalyst particle size of 8 nm, and was supported in an amount of 50% on a mixed carrier including C and $SiO_2$ in a weight ratio of 50:50. The PtTe/C+TiO₂ catalyst included Pt and Se in a mole ratio of 99.5:0.5, had a catalyst particle size of 6 nm, and was supported in an amount of 90 wt % on a mixed carrier including C and $TiO_2$ in a weight ratio of 50:50.

Comparative Example 1

Fabrication of a Mixed Reactant Fuel Cell

A mixed reactant fuel cell system was fabricated according to the same method as Example 1 except for using 0.34 g of the RuSe/C catalyst prepared in Preparation Example 1 as the cathode catalyst.

Then, the mixed reactant fuel cell systems fabricated according to Examples 1 to 3 and Comparative Example 1 were operated by injecting a mixture of 1M of methanol and dry air at 80° C. They were examined regarding voltage and power characteristics according to a current. The results are shown in FIGS. 3a to 6b.

FIGS. 3a, 4a, 5a, and 6a are respectively graphs showing voltage characteristics of the single cells according to Examples 1 to 3 and Comparative Example 1 of the present invention, and FIGS. 3b, 4b, 5b, and 6b are respectively graphs showing power characteristics of the single cells according to Examples 1 to 3 and Comparative Example 1.

As shown in FIGS. 3a to 6b, the mixed reactant fuel cell systems including a mixed catalyst of a RuSe/C catalyst and a PtS/C catalyst according to Examples 1 to 3 turned out to have excellent voltage drop and power characteristics compared with Comparative Example 1.

Therefore, a cathode catalyst for a mixed reactant fuel cell of the present invention has excellent catalyst activity and selectivity. When it is applied to a fuel cell system, the fuel cell system can have excellent power characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cathode catalyst for a mixed reactant fuel cell, comprising:
   a first catalyst comprising a Ru—Ch1 compound where Ch1 is a chalcogen selected from the group consisting of S, Se, Te, and combinations thereof; and
   a second catalyst comprising a Pt—Ch2 compound where Ch2 is a chalcogen selected from the group consisting of S, Se, Te, and combinations thereof, wherein the cathode catalyst comprises the first catalyst and the second catalyst in a weight ratio from 90:10 to 50:50.

2. The cathode catalyst of claim 1, wherein the first catalyst comprises Ru and Ch1 in a mole ratio from 80:20 to 95:5.

3. The cathode catalyst of claim 1, wherein the first catalyst has an average particle diameter ranging, from 2 to 8 nm.

4. The cathode catalyst of claim 1, wherein the second catalyst comprises Pt and Ch2 in a mole ratio from 70:30 to 99.5:0.5.

5. The cathode catalyst of claim 1, wherein the second catalyst has an average particle diameter ranging from 2 to 8 nm.

6. The cathode catalyst of claim 1, wherein the first catalyst or the second catalyst is supported on a carrier selected from the group consisting of a carbon-based material, an inorganic material particulate, and mixtures thereof.

7. The cathode catalyst of claim 6, wherein the carbon-based material is selected from the group consisting of graphite, carbon black, acetylene black, carbon nanotube, carbon nano fiber, carbon nano wire, carbon nano ball, activated carbon, and combinations thereof.

8. The cathode catalyst of claim 6, wherein the inorganic material particulate is an inorganic oxide including an element selected from the group consisting of Al, Si, Zr, Ti, W, and combinations thereof.

9. The cathode catalyst of claim 6, wherein the first catalyst or the second catalyst may be supported on a carrier in an amount of 50 to 90 wt % based on the total weight of the catalyst.

10. The cathode catalyst of claim 1, further comprising at least one catalyst selected from the group consisting of Fe-tetraphenylporphyrin (Fe-TPP), Co-tetraphenylporphyrin, (Co-TPP), Fe-tetramethoxyphenylporphyrin, (Fe-TMPP), Co-tetramethoxyphenylporphyrin (Co-TMPP), Fe-phthalocyanine (Fe—PC), Co-phthalocyanine (Co—PC), Ru—Mo—S, Ru—Mo—Se, Ru—W—S, and Ru—W—Se.

11. The cathode catalyst of claim 1, wherein the Ch1 is Se or Te, and the Ch2 is Se or Te.

12. The cathode catalyst of claim 11, wherein the first catalyst and the second catalyst are each supported on the carbon-based material.

13. A membrane-electrode assembly for a mixed reactant fuel cell, comprising:
   a polymer electrolyte membrane;
   an anode catalyst layer disposed on one side of the polymer electrolyte membrane; and
   a cathode catalyst layer disposed on the other side of the polymer electrolyte membrane, the cathode catalyst comprising:
      a first catalyst comprising a Ru—Ch1 compound where Ch1 is a chalcogen selected from the group consisting of S, Se, Te, and combinations thereof, and
      a second catalyst comprising a Pt—Ch2 compound where Ch2 is a chalcogen selected from the group consisting of S, Se, Te, and combinations thereof, wherein the cathode catalyst comprises the first catalyst and the second catalyst in a weight ratio from 90:10 to 50:50.

14. The membrane-electrode assembly of claim 13, wherein the anode catalyst layer comprises a platinum-ruthenium alloy catalyst.

15. A mixed reactant fuel cell system, comprising:
   an electricity generating element comprising:
      a membrane-electrode assembly comprising:
         a polymer electrolyte membrane;
         an anode catalyst layer disposed on one side of the polymer electrolyte membrane; and
         a cathode catalyst layer disposed on the side of the polymer electrolyte membrane, the cathode catalyst comprising:
            a first catalyst comprising a Ru—Ch1 compound where Ch1 is a chalcogen selected from the group consisting of S, Se, Te, and combinations thereof, and
            a second catalyst comprising a Pt—Ch2 compound where Ch2 is a chalcogen selected from the group consisting of S, Se, Te, and combinations thereof, wherein the cathode catalyst comprises the first catalyst and the second catalyst in a weight ratio from 90:10 to 50:50; and
      a plurality of conductive plates positioned at each side of the membrane-electrode assembly;
   a fuel supplier supplying the electricity generating element with a fuel; and an oxidant supplier supplying the electricity generating element with an oxidant.

16. The mixed reactant fuel cell system of claim 15, wherein the fuel is a lower alcohol having a carbon number of 1 to 4.

17. The mixed reactant fuel cell system of claim 15, wherein the mixed reactant fuel cell system further comprises a reactant mixing part.

18. The mixed reactant fuel cell system of claim 15, wherein the fuel cell system is a direct oxidation fuel cell system.

19. The mixed reactant fuel cell system of claim 15, wherein the fuel cell system is a direct methanol fuel cell system.

* * * * *